United States Patent [19]

Mazzara et al.

[11] Patent Number: 5,416,397
[45] Date of Patent: May 16, 1995

[54] LINEAR MOTOR CONTROL SYSTEM AND METHOD OF USE

[75] Inventors: Samuel M. Mazzara, Livonia; Richard Ogletree, Southfield, both of Mich.; Scott A. Martin, Rockford, Ill.

[73] Assignee: Ford Motor Company, Dearborn, Mich.

[21] Appl. No.: 130,821

[22] Filed: Oct. 4, 1993

[51] Int. Cl.6 .................................................. H02P 8/14
[52] U.S. Cl. ...................................... 318/696; 318/135
[58] Field of Search ............... 310/49 R; 318/696, 135

[56] References Cited

U.S. PATENT DOCUMENTS

| | | | |
|---|---|---|---|
| 4,477,757 | 10/1984 | Palombo et al. | 318/696 |
| 4,808,901 | 2/1989 | Sakamoto | 318/687 |
| 4,921,365 | 5/1990 | Sanders, Jr. et al. | 400/322 |
| 4,967,293 | 10/1990 | Aruga et al. | 360/78.12 |
| 4,990,840 | 2/1991 | Migda | 318/571 |
| 5,003,238 | 3/1991 | Lum et al. | 318/592 |
| 5,250,880 | 10/1993 | Chesney et al. | 318/135 |

*Primary Examiner*—Steven L. Stephan
*Assistant Examiner*—Judson H. Jones
*Attorney, Agent, or Firm*—Joseph W. Malleck; Roger L. May

[57] ABSTRACT

A control system that increases apparent linear motor stiffness and faster frequency for a digital electronic drive of one or more brushless DC linear motors. It comprises a position transducer providing an analog electrical signal indicative of the linear position of a movable part of the linear motor and being induced from an electrical signal supplied to or derived from the motor field winding; a converter for changing the analog signal to an acceleration feedback signal; a processor for providing a position error electrical signal derived by computing the difference between the actual position feedback signal and a position reference signal; and a processor for providing a velocity error electrical signal derived from the difference between the first derivative of the position error electrical signal and the actual velocity feedback signal to produce a velocity command signal, and for providing an acceleration error electrical signal derived from the difference between the second derivative of the position feedback signal and the actual acceleration feedback signal to produce a motor command signal to the field winding of the motor. A method of using such control system comprises providing a positioning apparatus having stacked movable members interconnected by linear motors to promote three-axis movement of a ram acting as the last of said movable members and carrying out the functions of the control for each linear motor.

6 Claims, 5 Drawing Sheets

LINEAR MOTOR CONTROL SYSTEM AND METHOD OF USE

BACKGROUND OF THE INVENTION

1. Technical Field

This invention relates generally to a system and method for controlling linear motors and, more particularly, to an improved system and method that increases apparent stiffness for such motors while using a digital electronic drive.

2. Discussion of the Prior Art

In multi-axis positioning devices for heavy industrial cutting tools, linear motors can desirably replace mechanical (ball screw) drives actuated by rotary motors. Mechanical drives have inherent stiffness or resistance to external forces arising from the friction between parts of the drive. In linear motors, force is transferred directly by noncontact electromagnetic field variations and thus lacks inherent stiffness to resist external forces. However, through the use of a control system, such motors can be given apparent stiffness.

Attempts by the prior art to provide such apparent stiffness have been isolated to light load applications and have resulted in low stiffness ranges (10,000–50,000 pounds/inch). Such stiffnesses are well below those necessary to meet the quality control requirements of high-speed, heavy industrial machine tool applications. Such attempts have used accelerometers which have not proved helpful in conjunction with heavy duty digital drives because (i) they reject disturbances in only one axis of motion, (ii) require cross-coupling in multi-axis machines, thereby limiting the ability to fine tune the performance of the machine, and (iii) require additional hardware, adding to the complexity of the electrical servo-loop causing a slower response. Exemplary of such art is U.S. Pat. No. 4,808,901, showing a control apparatus for linear motors used to position an optical disc reading element. Dedicated chips process analog signals from a motor positioning detector to provide a "present" position, velocity, and acceleration signal; these signals are then compared to target signals and adjustments are made to the analog signal to send a new current signal to the motor. A significant drawback of such analog control system is the difficulty of critically setting up the control at precise parameters and changing the control to suit new needs or to debug the system. Altering resistance or capacitance of the chip elements is expensive and time-consuming.

SUMMARY OF THE INVENTION

An object of this invention is to make the control system digitally functional to operate with microprocessors that allow easier setting of gains for control and at the same time achieve a faster frequency response to retain a high apparent stiffness and high positioning accuracy for the linear motor.

Thus, in a first aspect, the invention is a control system that provides increased apparent linear motor stiffness and faster frequency response for a digital electronic drive for one or more brushless DC linear motors having a motor field winding, comprising: (a) a position transducer providing an analog electrical signal indicative of the linear position of a movable part of the linear motor and being induced from an electrical signal supplied to or derived from the motor field winding; (b) a converter for changing the analog signal to an actual digital feedback signal, a velocity feedback signal and acceleration feedback signal; (c) means for providing a position error electrical signal derived by computing the difference between the actual position feedback signal and a position reference signal; and (d) means (i) for providing a velocity error electrical signal derived from the difference between the first derivative of the position error electrical signal and the actual velocity feedback signal to produce a velocity command signal, and (ii) for providing an acceleration error electrical signal derived from the difference between the second derivative of the position feedback signal and the actual acceleration feedback signal to produce a motor command signal to the field winding of the motor.

Another aspect of this invention is a method of using such control system, which comprises: (a) providing a positioning apparatus having stacked movable members interconnected by linear motors to promote three-axis movement of a ram acting as the last of said movable members; (b) for each linear motor, delivering a voltage signal derived from the linear motor winding to an induction coupling device that detects position of the motor movable element to generate a digital position voltage signal; (c) directly processing such digital signal with a computer programmed for one of proportional, proportional integral, and proportional integral derivative controls, and similarly controlled gains to provide a force signal; and (d) feeding the force signal to a flux vector control to produce a three-phase command signal for the associated linear motor.

DETAILED DESCRIPTION AND BEST MODE

Figure 1:
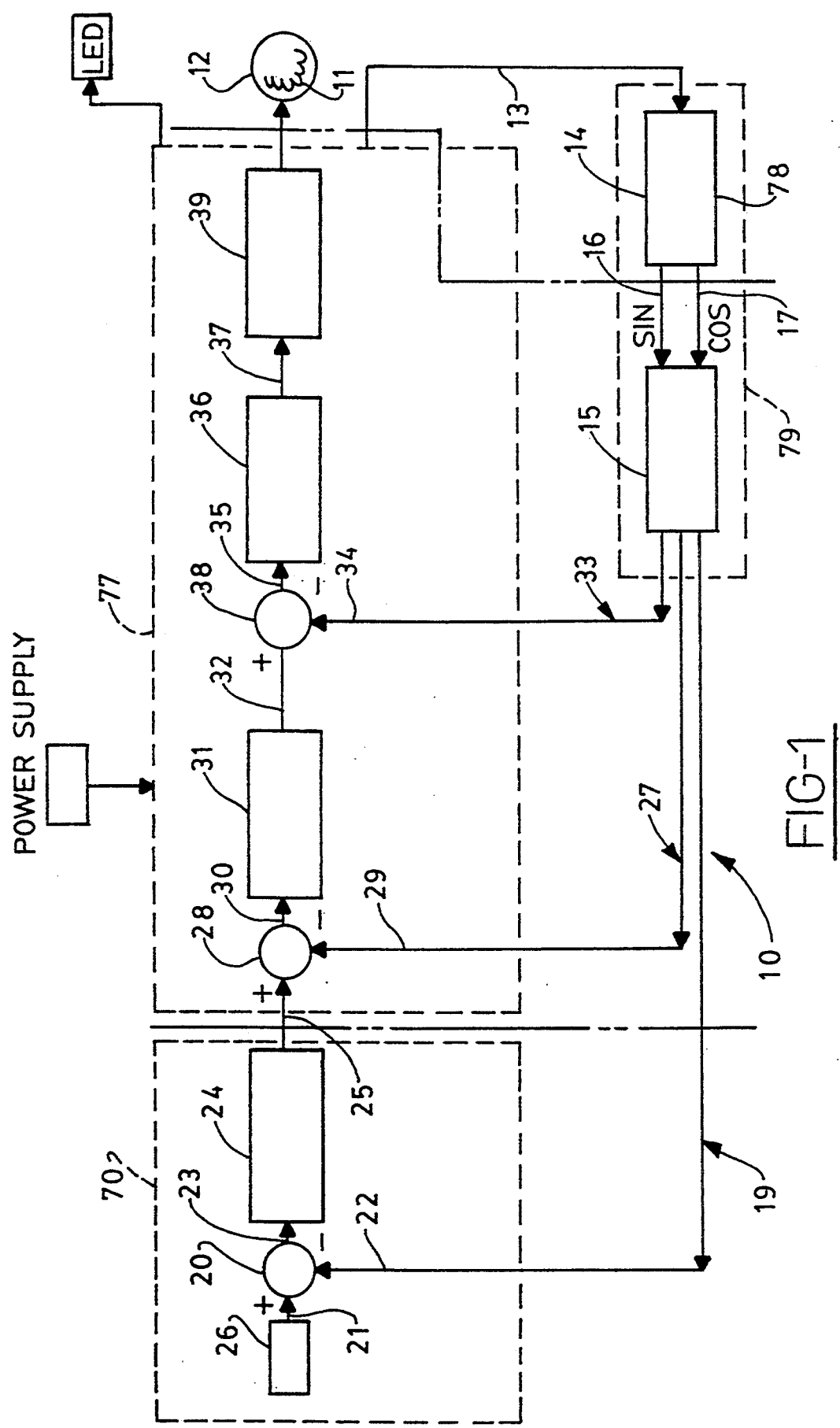
FIG. 1 is a block diagram of the control system of this invention.

A control system 10 that meets the object of this invention is diagrammed in FIG. 1. The voltage in the field winding 11 of a linear motor part 12 is supplied and varied by an electronic drive controller 77; such controller also supplies a small electrical DC excitation voltage along path 13 to excite a position transducer 14 (inductive coupler). Such excitation voltage signal is transformed by a reader head 78 into two induced voltages (90° phased-sine signal 16 and cosine signal 17) that are unique for a specific displacement of the movable part of the linear motor. The sine and cosine signals are transformed into combined digital signals by digital converter 15. The transducer and digital converter usually are consolidated into a linear scale assembly 79.

The digital signal 22 is communicated to a computer control 70 of a numerically controlled machine, thence to the digitized electronic drive control 77, and thence to a motor command signal amplifier 39 which drives the linear motor 12. Such communication is advantageously accomplished by fiber optic channels which further reduce electronic noise and enhance fine tuning of the control.

The drive controller 77 receives velocity feedback and acceleration feedback signals 29 and 34 from the linear scale assembly 79 in closed loop, close-coupled manner. This is important because it (i) reduces electronic noise (magnetic flux) and disturbances that prevent rapid current compensation (which would slow the control adjustment), (ii) the microprocessors of the drive unit 77 can run faster at higher clock speeds, and (iii) the drive unit can run at higher switching frequencies with more gain and thus more apparent stiffness or resistance. A first electrical loop 19 provides position compensation by summing (at 20) a desired computer generated position signal 21 (from a microprocessor 26) and an actual real-time digital position feedback signal 22 to produce a position error signal 23. As part of the microprocessor of a CNC (computerized numerical control) device 70, the error signal is compensated at 24 by proportional, integral, and/or derivative gains to produce a compensated position signal 25.

A second electrical loop 27 sums, at 28, the first derivative of the compensated position signal 25 and the actual or real-time digital velocity signal 29 to produce a velocity error signal 30. As part of an independent microprocessor separate from the CNC, velocity compensation (proportional, integral, and/or derivative) is carried out in a microprocessor 31 on the velocity error signal 30 to produce a compensated velocity signal 32 according to software algorithms.

A third electrical loop 33 sums, at 38, the compensated velocity signal 32 and the actual real-time digital acceleration feedback signal 34 to produce an acceleration error signal 35. Again, as part of a second independent microprocessor 36, an acceleration compensation is carried out on the error signal 35 to produce a compensated acceleration signal 37 (proportional, integral, and/or derivative) in accordance with software algorithms.

Figure 2:
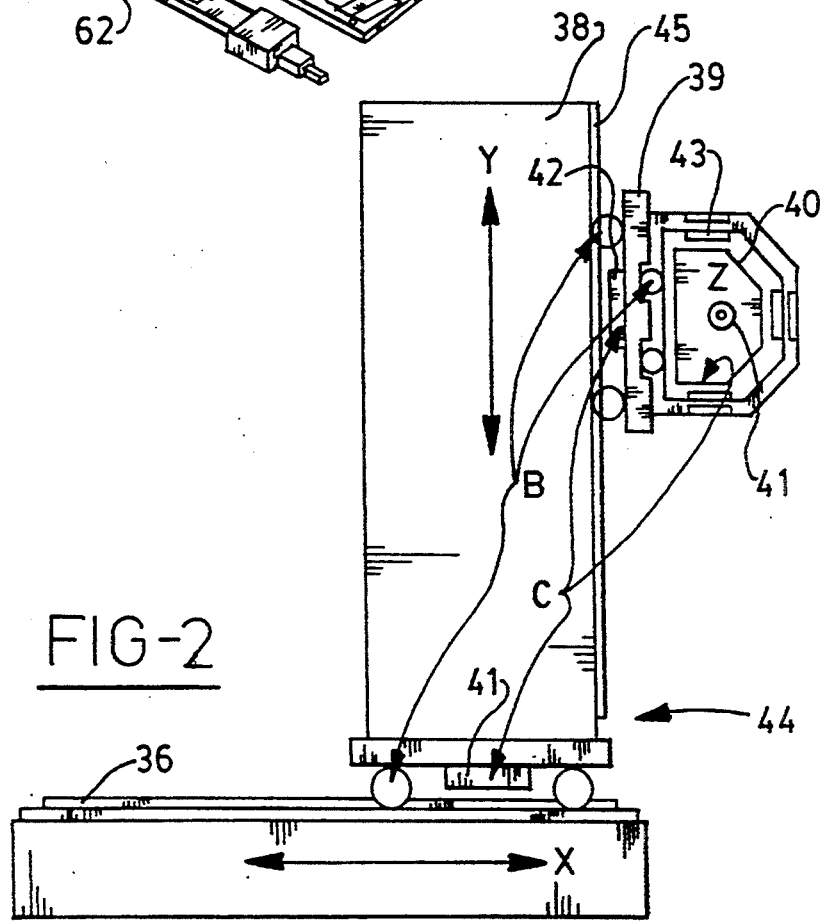
FIG. 2 is a schematic illustration of a three-axis positioning device employing linear motors of the type in FIG. 3.

The control system is useful to control actuating motors for a multi-axis positioning machine such as shown in FIG. 2. A series of linear motors C are employed in clusters as actuators for positioning a cutting tool 41 on a three-axis positioning device 44 having elements 38, 39, and 40 relatively movable on bearings B. The positioning device is used for carrying out machining such as heavy-duty boring or milling. The column 38 is movable along a horizontal track (X-axis) by a cluster of linear motors 41 using permanent magnets 36 layed out along the movable path of the column. A saddle 39 is movable vertically along a track (Y-axis) on one side of the column by cluster of linear motors 42 using permanent megnets 45; and a ram 40 is movable (along a Z-axis which is at a right angle to the Y-axis) by a cluster of linear motors 43. Each of the linear motors in each cluster is comprised of a movable part and a fixed part. The movable part can be a moving coil assembly and the fixed part can be stationary permanent magnets.

Figure 4:
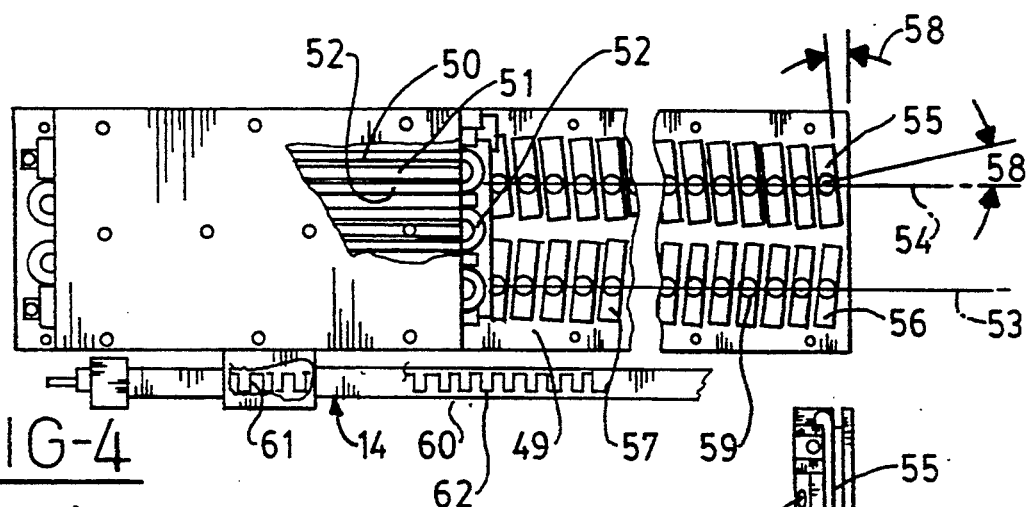
FIGS. 4–5 are respectively plan and end views of the structure of FIG. 2.
Figure 5:
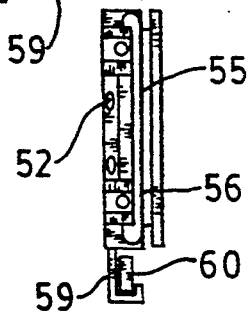
Figure 3:
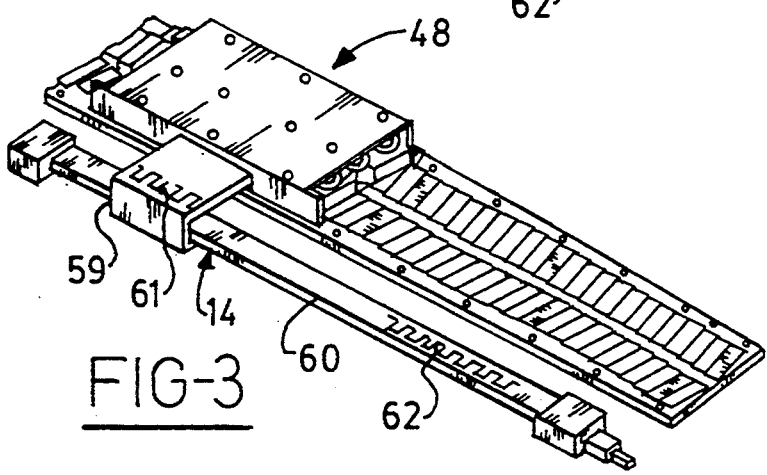
FIG. 3 is a perspective view of a linear motor useful with this invention.

In FIGS. 3–5, the linear motor assembly is shown in greater detail. A coil assembly 48 is constructed of ferromagnetic plates 50 laminated in an epoxy material to provide slots 51 in which coil windings 52 are deposited prior to lamination. Potting techniques are used to carry out the lamination so that the coils are embedded in a material substantially devoid of bubbles or contaminants which inhibit heat transfer and thereby decrease the life of the coils 52. The coils may be connected in series within a coil assembly and the assemblies connected in parallel to a power control. The control 10 may supply the coils with two, three, or more phases, and electronic commutation is used to change the polarity of the coils to keep a constant electromagnetic thrust force in one desired direction to promote linear motion. For the specific embodiment of this invention, the power supply to the control 10 for the coil packs may desirably be 460–480 VAC, three-phase, 60 Hz. Cooling channels may be incorporated into the laminated plates to dissipate high heat generated by the motor induction, such cooling supplementing any convective cooling achieved by circulating a gas about the motor coil assemblies.

As shown in FIG. 4, permanent magnets 57 are attached to the fixed part 49, arranged in rows 53, 54, with pairs of permanent magnets parts 55, 56 placed side-by-side with the same polarity abutting. The abutting polarity alternates in the next level down the row. Thus, for example, north poles abut in the first level, south poles abut in the second level, north poles abut in the third level, and so on. Each of the magnets in a pair is skewed an angle 58 of approximately 15° to the centerline of the row. Each magnet has a physical size of about 2–3 inches in length and ¾ to 1¼ inches in width. The permanent magnets 57 are preferably comprised of a rare earth composition, such as NdFeB type, providing an unusually high flux density. Each of the permanent magnets may have a hump 59 along its exposed side, the hump being effective to promote increased magnetic field strength.

Figure 6:
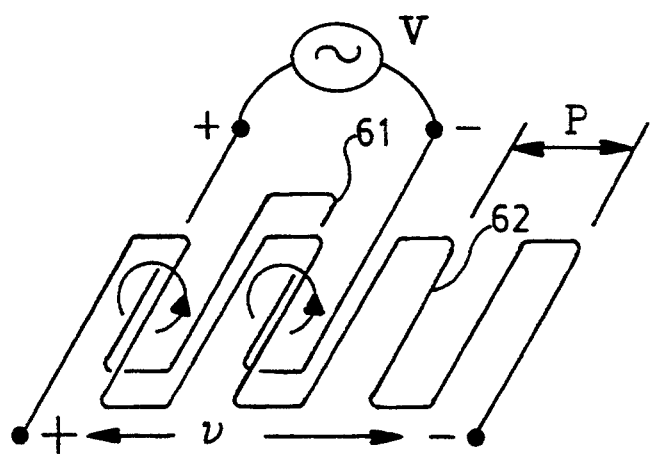
FIGS. 6–8 are schematic staged illustrations of an inductive coupling forming part of the position transducer useful with the control system of this invention.
Figure 7:
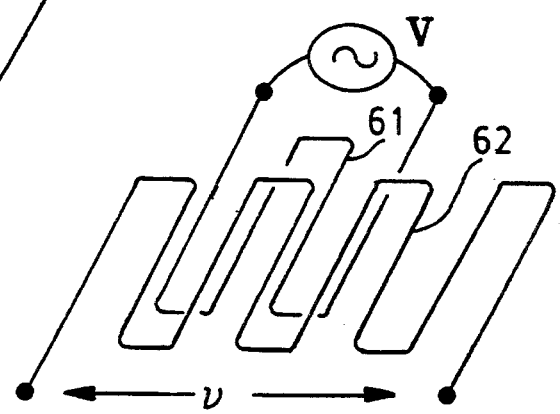
Figure 8:
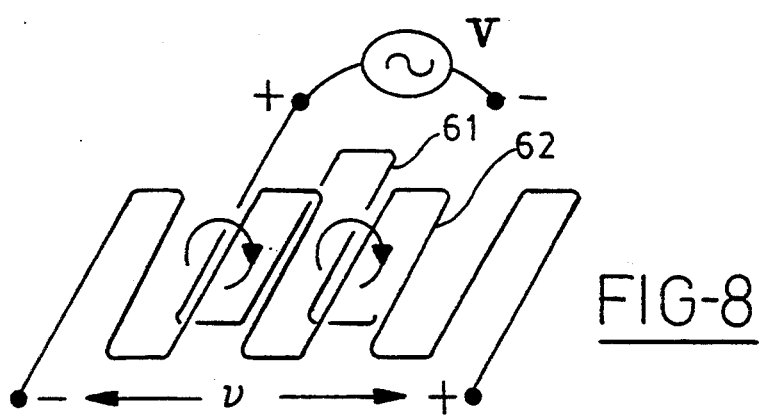
Figure 10:
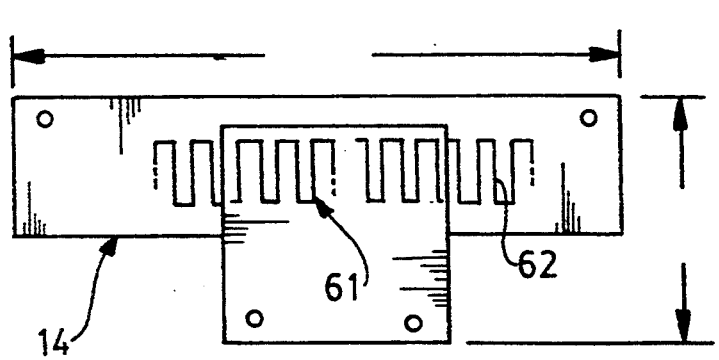
FIGS. 10 and 9 are respectively plan and end elevational views of the position transducer.
Figure 9:
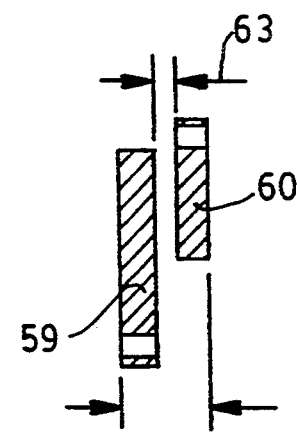

The position transducer 14 of the control 10 has an electrical windings 61 partially enclosed and attached to the movable part of the linear motor by slide 59. The windings of the slide are matched to scale windings 62 layed out along a bar 60 secured to a fixed or reference part of the positioning assembly. Each of the windings has precision printed circuit patterns with parallel hairpin turns repeated along the flat bar 60 and repeated in the windings of the slide. The length of one complete cycle of the hairpin pattern is the pitch P (see FIG. 6). Inductive coupling between the windings is used to measure displacement. Windings 60 are attached to the fixed machine part. The hairpin loops of each winding are parallel and separated by a small air gap 63 (FIG. 9). An alternating current, flowing in one conductor, will induce a voltage in the other that depends on the relative position of the conductors of the windings. The induced voltage is a positive maximum when the loops are facing and the coupling ratio will be maximum. The voltage passes through zero when loops are offset midway between the pitch (see FIG. 6), and rises to a negative maximum at the next facing location (see FIG. 7). Calling the pitch P and the input voltage V, the relation between induced voltage v and displacement x is: ($v_a = kV$ cosine to $\pi x/p$). A second output winding with the same pitch P may be located adjacent the first and displaced P/4 from it. The voltage $v_b$ induced in this conductor is: $v_b = kV$ sine to $\pi x/p$. Only the amplitudes of $v_a$ and $v_b$ change. Phase remains constant while amplitude is a function of relative displacement x/p. There is a unique pair of induced voltages $v_a$ and $v_b$ for every location within one cycle of the pitch P. Thus, by measuring these voltages and subdividing the accurately known pitch interval, the position of the movable part can be known with high precision. The 90° phase difference between the movable windings (FIG. 10) is in space phase and not in time phase. Windings on the stator may be arranged in groups to permit the displacement of one group of windings, one-quarter space cycle from the other. The air gap between the printed circuit windings should be about 0.007 inch. The position transducer produces two phase signals, one sine and the other cosine, the frequency being about 10 KHz (range being 2.5–100 KHz) and the voltage is about two volts (1–100 volts). Thus, the induced voltage produces a unique pair of voltages in the slider so that the ratio of the sine and cosine voltages gives positions when subdivided by pitch. The sine and cosine signals are chopped to provide trapezoidal commutation for higher switching frequency and the ability to filter out noise.

The digital converter 15 produces natural binary digital words using a ratiometric conversion method to eliminate noise. Such converter may be of the variable resolution type and operate over a 50–20,000 $H_2$ reference frequency; such a converter is supplied by Analog Devices of Norwood, Mass., and is designated as monolithic converter 2S80. The conversion will depend on the ratio of the input signals.

Figure 11:
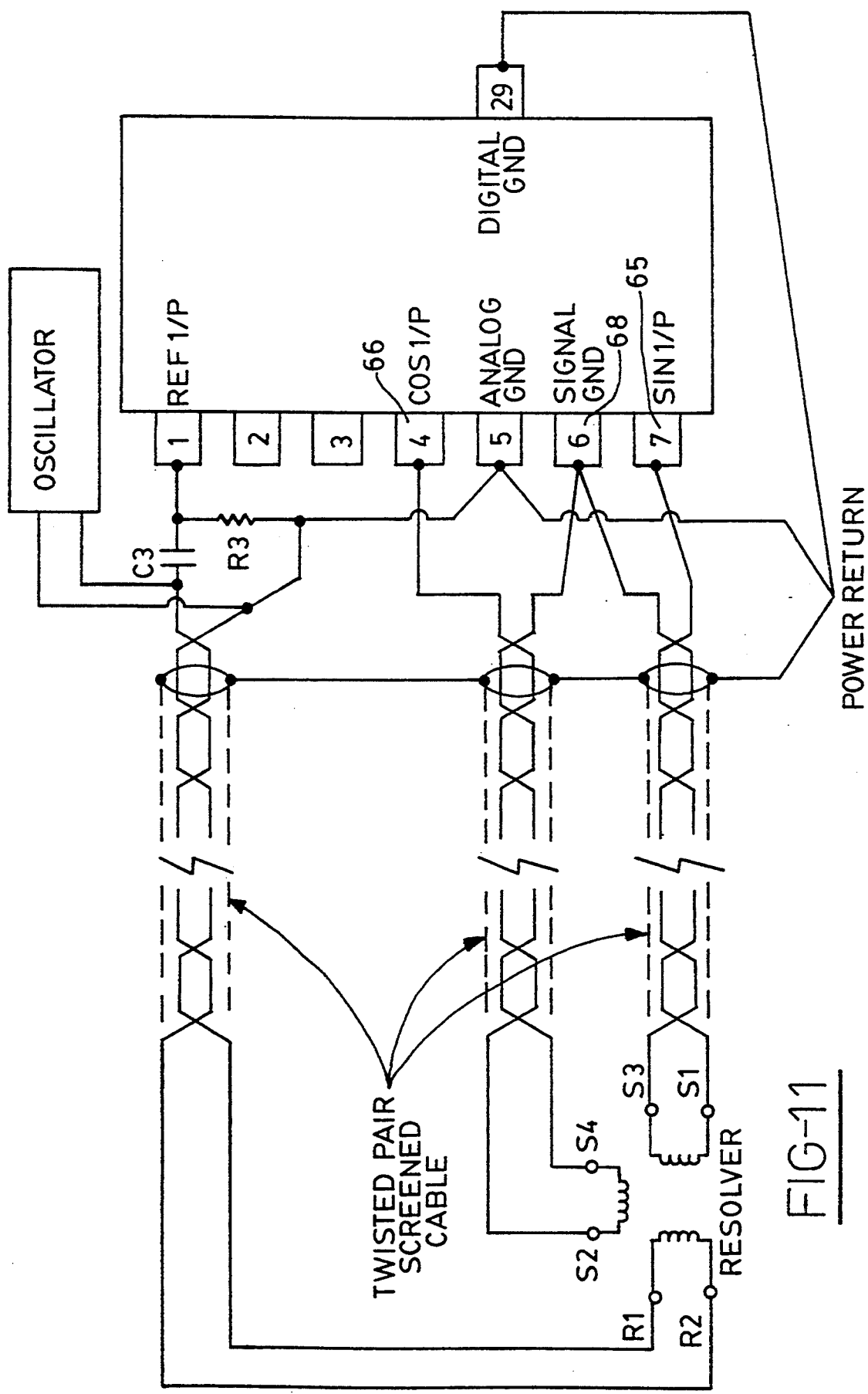
FIG. 11 is a circuit configuration for the reader head part of the position transducer.

As shown in FIG. 11, the signal connections for the read-head of the converter should be made to the sine and cosine outputs of the position transducer as inputs 65, 66 and as reference input 67 and signal ground 68. The interface board of FIG. 11 has three basic functions:

1. To apmplify the amplitude modulated sine/cosine signals originating from the read-head leads 52,54 and 53,51. The lead lengths of 52,54 and 53,51 must be kept to a minimum length (12" maximum) as well as away from the noise sources such as th elinear motors.

2. To perform a resolver to digital conversion utilizing an analog converter device 2590 IC. This device requires a 9.5 volt reference signal which coincides with position transducer excitation source. In addition, the amplified read-head cosine signal and reference input to the 2590 waveforms must intersect at a 0 volt pint (either 0° or 180°). The conversion to digital process converts the sine/cosine signal to 4096 discrete values per pitch of the position transducer scale. Each 4096 counter cycle produces (1) Z-marker pulse. The actual output of conversion to digital is in an A-Quad-B form.

3. To convert the A-Quad-B signal to a fiber-optic form transmitted to the motion control encoder input.

The read-head scale distance is within 0.010". The scale read-head must be aligned to minimize sine/cosine amplitude differences to thereby minimize velocity-related force ripple. The excitation and sine/cosine leads are twisted and the power oscillator to excitation lead is routed to minimize length and proximity to motor windings.

The power return connected to the analog ground is of substantial gauge such as 18 gauge.

The compensated position error signal 25 is transferred to the drive unit 77 which contains microprocessors to apply closed-loop velocity/acceleration control and vector flux control; such unit 77 provides electronic commutation to switch polarity of the current in the linear motors between phases. Although the microprocessors can use disc memory, ROM memory enhances the speed of control eliminating searching throughout the memory system.

The drive unit 77 has two microprocessors and two summing devices for feeding electrical signals to the microprocessors in series. The first summing device of the loop 27 provides a velocity error electrical signal derived by computing the difference between the first derivative of the position error electrical signal and the actual velocity feedback signal to produce a velocity command signal. The second summing device of loop 132 provides an acceleration error electrical signal derived by computing the difference between the second derivative of the position feedback signal and the actual acceleration feedbacksignal to produce a motor command signal to the field winding of the linear motor. The velocity compensator provides proportional, integral, and derivitive control. The control action P, PI, or PID) is user programmable as are the proportional, integral, and derivitive gains. The output of the velocity compensator is the input to the acceleration summing junction.

Figure 12:
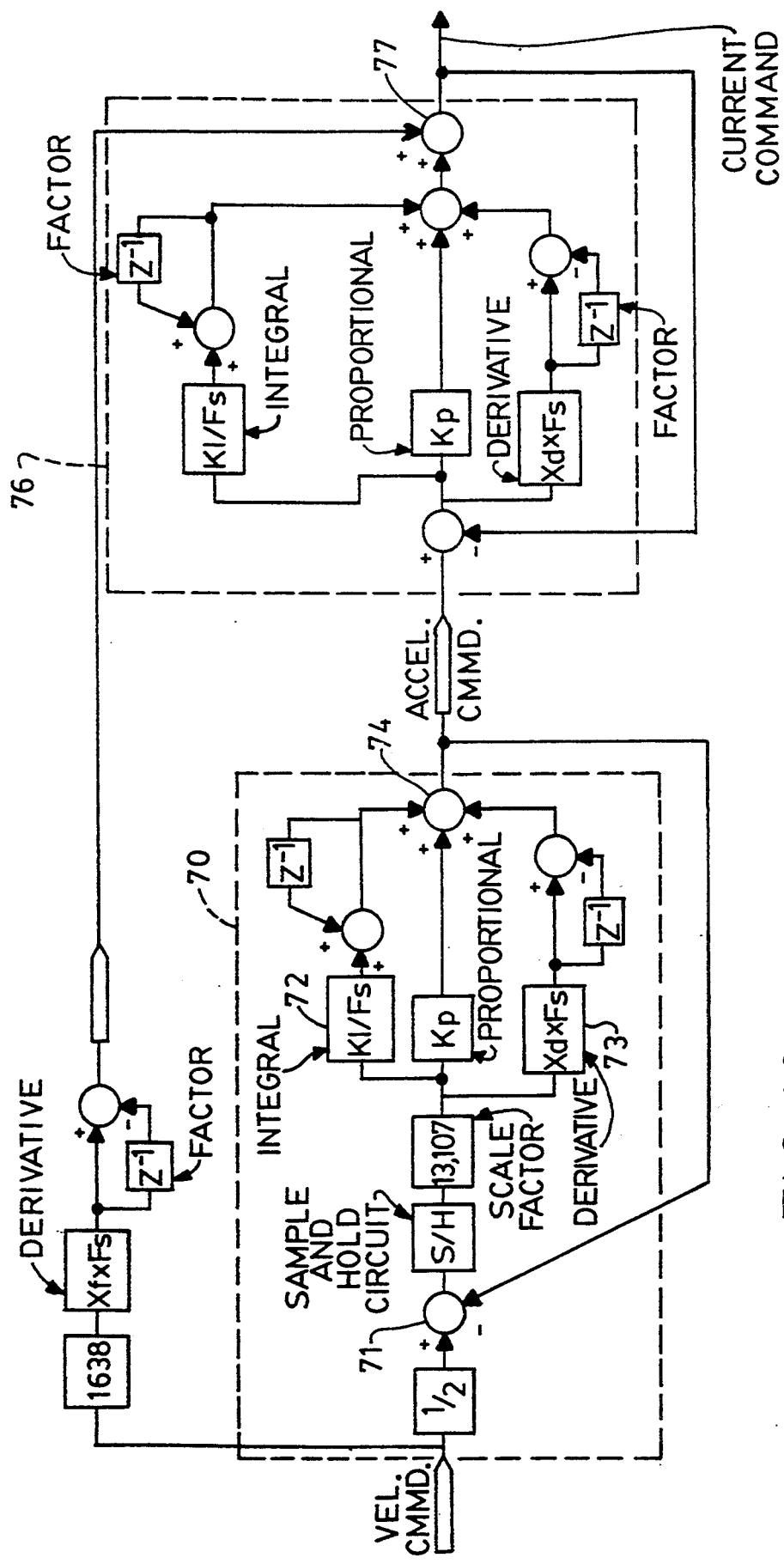
FIG. 12 is an expanded illustration of the elements of the microprocessor for calculating velocity and acceleration compensation.

The vector rotation aspects of the computerized controller are comprised of a phase advance, three-phase to two-phase converter, and a vector de-rotate as well as a converter for vector rotation. The elements of the drive unit and the microprocessor functions are outlined in FIG. 12 to optimize compensation stiffness and acceleration.

In the velocity PID compensator to a ±5 volt reference signal is scaled at 71 and quantified before actual compensation. The scaling is 32767 counts/2.5 volts = 13,107 final scaling. The Fs term shown in the integral gain stage 72 and derivative gain stage 73 represents the sampling rate which can also be described as the inverse of the sample period 1/T. The equivalent Laplace operator for this system is: $S=Z^{-1}/T*Z$ (Z being the unit delay operator). Representing the system in this fashion keeps the sample rate from affecting the overall compensator gain. The final summation at 74 of the velocity loop compensator is fed into the current loop command input. The velocity loop derives its feedback from either the position quadrature signal (such as 75 in FIG. 12) or from the digital converter as shown in FIG. 1. As with any compensator attempting a derivative term, the feedback must be noise free to take advantage of the derivative gain.

An acceleration loop 76 added to the linear motor control scheme serves three basic purposes:
1. To optimize system disturbance rejection.
2. To maximize system acceleration via the acceleration input.
3. To compensate for defficiencies in the velocity loop due to noise or resolution.

The compensation scheme is idential to that of the velocity loop. The feedback has a high bandwidth. Inertial accelerometers possess qualities suitable for this loop. The velocity feed forward term provides a means to maximize system acceleration and minimize following error for interpolative type moves. Using the velocity reference requires a derivative type compensation at 77 in order to inject an acceleration command directly into the current loop input.

The microprocessors of the drive unit may be connected to a common register or bus bar to improve response time, the microprocessor still being in series, but the commonality of connection reduces communication noise and time. The switching transistors of the drive unit are of the integrated gate bipolar type. Preferably, the bandwidth of the position signal is about 1500 Hz, the velocity bandwidth about 500 Hz, and the acceleration bandwidth about 1000 Hz. Such bandwidths are wider because the program gains can be set higher at higher frequency because there is no need to reject low frequency disturbances. The close-coupled loops do not have to process external signals; there is an avoidance of phase shift disturbances. This increases motor stiffness by a factor of 4.

We claim:

1. A control system for a brushless DC linear motor having fixed and movable linear motor parts, one of the parts having electrical field windings through which voltage and current are varied to affect positional control of the movable motor part comprising:
   (a) position transducer providing an analog electrical signal and indicative of the linear position of said movable part and being induced from an electrical signal supplied to or derived from said motor field winding, said position transducer having a pair of windings with predetermined pitch, one winding receiving an electrical signal derived from that supplied to said field winding, and the other winding having an induced analog electrical signal based on the relative position of said windings to each other,
   (b) a digital converter for changing said analog signal to an actual digital feedback signal, a velocity feedback signal, and an acceleration feedback signal;
   (c) means for providing a compensated position error electrical signal derived by computing the difference between said actual position feedback signal and a computer programmer position reference signal and compensating such error signal; and
   (d) means close-coupled to said linear motor (i) for providing a velocity error electrical signal derived from the difference between the first derivative of said position error electrical signal and said actual velocity feedback signal to produce a velocity command signal, and (ii) for providing an acceleration error electrical signal derived from the difference between the second derivative of the position feedback signal and said actual acceleration feedback signal to produce a motor command signal to said field winding of said motor.

2. The control system as in claim 1, in which said means (d) is comprised of two microprocessors and two summing devices for feeding electrical signals to said microprocessors in series, the first summing device providing said velocity error electrical signal and said first microprocessor providing proportional integral or derivative control actions and gains to produce a velocity command signal, the second summing device providing said acceleration error electrical signal and said second microprocessor providing another derivative integration of said velocity command signal to produce said motor command signal.

3. The control system as in claim 1, in which the electrical signal supplied to said position transducer is about −10 to +10 volts D.C. and the signals produced by said digital converter are each about 10 amps per volt D.C.

4. A control system for a brushless DC linear motor having fixed and movable linear motor parts, one of the parts having electrical field winding through which current and voltage are varied to affect positional control of the movable motor part; comprising:
   (a) means for (i) inductively coupling a pair of hairpin windings, one attached to the movable part of the linear motor and the other layed out along the path of the movable part, the induced sine and cosine analog signals being an indicator of position of the movable part, and (ii) for converting said signals to provide digital actual position, velocity, and acceleration signals;
   (b) means for processing said digital signals in series to a compensated motor control signal having a higher switching frequency, trapezoidal commutation, and an absence of low frequency noise, said means for processing having microprocessors in closely-coupled closed loops with means (a), said means for processing transforming the digital signals to a three-phase voltage motor control command for the linear motor.

5. The control system as in claim 4, in which said means (b) for processing said digital signals to a compensated motor control is comprised of a separate closed loop for each of velocity compensation and for acceleration compensation.

6. A method of using a control system for one or more brushless DC linear motors, comprising:
   (a) providing a positioning apparatus having stacked movable members interconnected by linear motors to promote three-axis movement of a ram acting as the last of said movable members;
   (b) for each linear motor, delivering a voltage signal derived from the linear motor winding to an induction coupling device that detects position of the motor movable element to generate a digital position voltage signal;
   (c) directly processing such digital signal with a computer programmed for one of proportional, proportional integral, and proportional integral, and proportional integral derivative controls, and similarly controlled gains to provide a force signal; and
   (d) feeding the force signal to a flux vector control to produce a three-phase command signal for the associated linear motor.

* * * * *